Jan. 30, 1940.  J. P. KRIECHBAUM  2,188,877
TEMPERATURE CONTROL SYSTEM
Filed Oct. 2, 1937
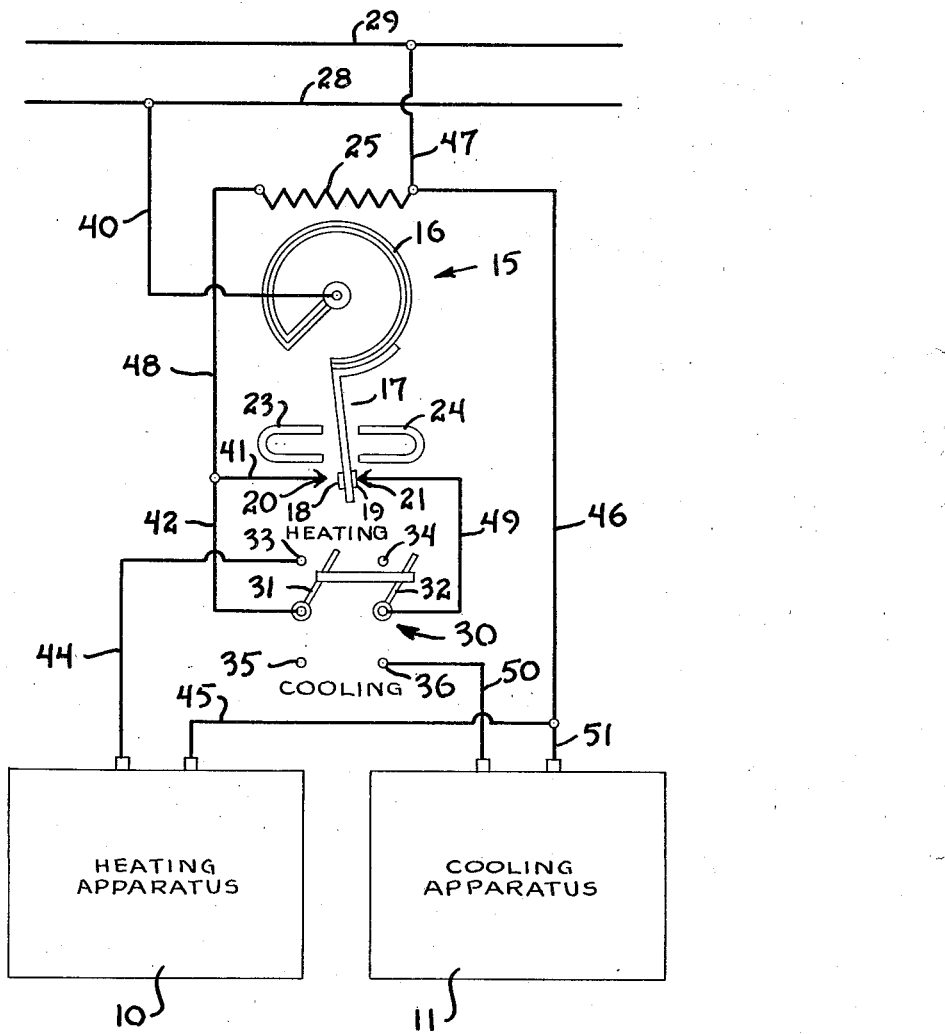
John P. Kriechbaum
INVENTOR
BY *George H Fisher*
ATTORNEY Patented Jan. 30, 1940

2,188,877

UNITED STATES PATENT OFFICE 2,188,877

TEMPERATURE CONTROL SYSTEM

John P. Kriechbaum, Minneapolis, Minn., assignor to Minneapolis-Honeywell Regulator Company, Minneapolis, Minn., a corporation of Delaware Application October 2, 1937, Serial No. 167,032

2 Claims. (Cl. 257—3)

The present invention relates to an improved temperature control system and more particularly to one of the so-called "anticipating" type. It has been proposed in the prior art, in the case of a thermostatically controlled heating device, to place an auxiliary heater in proximity to the thermostat, the auxiliary heater being energized when the thermostat is calling for operation of the heating device. The effect of this auxiliary heater is to cause the thermostat to be heated up more rapidly than would be the case if such heating were due solely to the rise in ambient temperature. The result is that the thermostat is caused to interrupt the operation of the heating apparatus slightly before the temperature has risen to the desired upper value. In view of the fact that in almost any type of heating device a certain lag exists between the generation of heat and its delivery to the immediate region of the thermostat, such termination of the call for heat before the heat has actually been delivered to the space in which the thermostat is located causes the thermostat to, in effect, "anticipate" the arrival of the heat. If the value of the auxiliary heater is properly chosen relative to the average lag in delivery of heat to the space, it is possible to maintain the temperature extremely constant.

This method of anticipating the effect of the operation of the heating apparatus has been so successful in commercial practice that an attempt has been made to apply the same principle to the operation of cooling apparatus. The results in this connection have previously not been entirely satisfactory. The common method by which this has been accomplished is to place the auxiliary heater in series with the cooling apparatus making it have a sufficiently high resistance value that so long as it is in series, the cooling apparatus is not placed in operation. Upon a call for cooling, the thermostat operates to shunt the auxiliary heater out of the circuit, thus furnishing sufficient power to the cooling apparatus for its operation and at the same time causing a decrease in the temperature adjacent the thermostat. This decrease in the temperature adjacent the thermostat had as its effect the anticipation of the cooling produced by the operation of the cooling apparatus. The difficulty with this system was that the selection of an auxiliary heater having a resistance high enough to prevent operation of the cooling apparatus when it was in series therewith constituted a serious limitation. In the first place, in order to be sure that sufficient heat was supplied by the auxiliary heater, it was necessary to select the auxiliary heater for each installation so as to be sure that the resistance of the auxiliary heater bore the proper relation to the internal resistance of the operating mechanism of the cooling apparatus. In the second place, the system was inherently energy wasting inasmuch as regardless of how high a resistance the auxiliary heater was given a certain amount of energy would be consumed in the cooling apparatus, which energy was entirely wasted.

Moreover, in certain cases it is desirable to use the same thermostat for controlling the heating apparatus in winter and cooling apparatus in summer. With these previous arrangements, it has been impossible to employ a thermostat for both uses, particularly if it were desired to obtain the anticipating effect with both the heating apparatus and the cooling apparatus.

An object of the present invention is to provide an improved control for both heating and cooling apparatus in which such an anticipating effect is obtained regardless of which apparatus is operated.

A further object of the present invention is to provide an improved control for both heating and cooling apparatus in which a heater adjacent a thermostatic control is so connected that when the control is connected to heating apparatus the heater is energized only when the apparatus is operated, and when the control is connected to cooling apparatus, the heater is always energized except when the cooling apparatus is operated.

A further object of the present invention is to provide an improved method of obtaining such an anticipating effect with cooling apparatus in which the energization of the anticipating element does not result in even the partial energization of the cooling apparatus when there is no demand for cooling.

Other objects of the present invention will be apparent from a consideration of the accompanying specification, claims and drawing.

In the single figure of the drawing, the improved temperature control system is shown in schematic form. In view of the fact that both the heating and cooling apparatus may be of any conventional form, the details thereof have not been shown. The heating apparatus is indicated by the reference numeral 10 and the cooling apparatus by the reference numeral 11. It is to be understood that both the heating apparatus and cooling apparatus are electrically controlled. Thus, the heating apparatus may take the form of a gas fired warm air furnace wherein the control of the apparatus is effected through the opening and closing of an electrically operated gas valve. Similarly, the cooling apparatus may take the form of a refrigerating system wherein cooling fluid is circulated through coils in the duct of what is the heating system during the winter. In this case, the control of the cooling apparatus may be exercised through the compressor which is stopped and started in accordance with the demand for cooling.

The thermostat of the cooling system is generally indicated by the reference numeral 15. This thermostat comprises a bimetallic element 16 to which is secured a contact arm 17. The contact arm 17 carries contacts 18 and 19, which in turn cooperate with fixed contacts 20 and 21, respectively. Cooperating with the contact arm 17 is a pair of permanent magnets 23 and 24. These magnets serve to impart a differential to the operation of the device and to cause a quick making and breaking of the contacts to prevent arcing. Thus, considering the engagement and disengagement of contacts 18 and 20, it will be apparent that as contact arm moves in a direction to cause engagement of contacts 18 and 20, the magnet 23 will exert an increasing effect upon contact arm 17. By the time that such engagement of contacts 18 and 20 is effected, it will be necessary for the temperature to change to a considerable extent in the opposite direction before contacts 18 and 20 are separated. When the temperature does change this much, the arm is abruptly moved sufficiently to the right to cause engagement of contacts 19 and 21. The latter part of this movement is accelerated by the action of the other magnet 24. Thus the engagement of contacts 18 and 20 is effected at one temperature and a disengagement thereof at a different temperature. By reason of this, it is assured that the apparatus whose starting and stopping is controlled by such contacts would not be started and stopped with excessive frequency such as might arise where the contact arm 17 was subjected to a slight mechanical vibration or to a rapidly fluctuating temperature change. Moreover, the contacts are made and broken with such abruptness that no substantial arcing occurs. While bimetallic element 16 can be arranged in any desired manner, it is so selected in the form shown in the drawing that upon a temperature rise the contact arm 17 is deflected to the right so as to cause engagement of contacts 19 and 21 and upon a temperature drop to the left to effect the engagement of contacts 18 and 20.

Associated with the thermostat 15 is an auxiliary heater 25. This auxiliary heater may have a suitable value of resistance which will enable it to supply the required amount of heat when connected across line wires 28 and 29 which furnish power to the system and which lead to any suitable source of power (not shown).

A double-pole double-throw switch is generally indicated by the reference numeral 30. This switch consists in the usual manner of two blades 31 and 32 insulated from each other. The blades 31 and 32 in a first position are adapted to engage with contacts 33 and 34, and in a second position with contacts 35 and 36. Contacts 34 and 35 are unused and play no part in the operation of the system. The switch 30 is employed to change the thermostat from control of the heating apparatus to control of the cooling apparatus and vice versa. In the first position of switch 30, that is when switch blade 31 is in engagement with contact 33, the thermostat is in control of the heating apparatus and in the second position of the switch it is in control of the cooling apparatus.

*Operation*

Let it be assumed that it is desired to operate the heating apparatus. Accordingly, switch 30 is placed in its upper position in which switch blade 31 is in engagement with contact 33. When the thermostat is in the position shown in the drawing, the temperature in the space in which thermostat 15 is located is above the desired minimum value. Let it be assumed that the temperature begins to decrease and decreases sufficiently so as to cause disengagement of contacts 19 and 21 and engagement of contacts 18 and 20. As soon as this occurs, a circuit is established to the heating apparatus as follows: from line wire 28 through conductor 40, bimetallic element 16, contact arm 17, contacts 18 and 20, conductors 41 and 42, switch arm 31, contact 33, conductor 44, heating apparatus 10, and conductors 45, 46 and 47 to the other line wire 29. The establishment of this circuit places the heating apparatus in operation.

The engagement of contacts 18 and 20 also establishes a circuit to the auxiliary heater 25 as follows: from line wire 28 through conductor 40, bimetallic element 16, contact arm 17, contacts 18 and 20, conductors 41 and 48, auxiliary heater 25, and conductor 47 to the other line wire 29. It will be noted that heater 25 is in effect connected in parallel with the heating apparatus.

With both the heating apparatus and the auxiliary heater 25 in operation, the temperature adjacent the bimetallic element 16 begins to rise both by reason of the rise in ambient temperature and also by reason of the rise in temperature produced by auxiliary heater 25. The result is that after a certain amount of time has elapsed, contact arm 17 will be moved to the right sufficiently by bimetallic element 16 to effect disengagement of contacts 18 and 20. This causes the operation of both the heating apparatus and the auxiliary heater to be terminated. The auxiliary heater now begins to cool. However, such cooling action is somewhat slow and if sufficient heat has been generated by the heating apparatus as is normally the case, the delivery of heat to the space will offset the cooling of the bimetallic element 16 resulting from the cooling of auxiliary heater 25. If, however, sufficient heat has not been delivered to the space by the time the bimetallic element 16 has cooled down, contacts 18 and 20 will again be engaged and the cycle will be repeated.

The engagement of contacts 19 and 21 has only been casually mentioned inasmuch as contact 21, with the switch 30 in its heating position, is not connected to any apparatus. Consequently, the engagement of contacts 19 and 21 has no effect whatsoever beyond limiting the movement of arm 17 to the right.

The case will now be considered in which it is desired to have operation of the cooling apparatus. In this case, switch 30 is moved to its lower position in which switch arm 32 is in engagement with contact 36. Let it be assumed that when the switch 30 is so moved that instead of the position shown in the drawing, the thermostat 15 is in such a position that contacts 18 and 20 are in engagement. The engagement of contacts 18 and 20 causes a circuit to be established through auxiliary heater 25, as previously indicated. However, due to the fact that switch blade 31 is now moved out of engagement with contact 33, no circuit is established to the heating apparatus when contacts 18 and 20 are in engagement. It is to be understood that under normal conditions the thermostat is set at a considerably higher value during the summer so that the engagement of contacts 18 and 20 does not indicate that a temperature exists in the space which requires operation of the heating apparatus. Thus when the temperature outside is at 90, the thermostat may well be set at 75 or even higher.

If now the temperature adjacent the bimetallic element 16 begins to rise, contacts 18 and 20 will be suddenly separated with a snap action and contact 19 will be abruptly moved into engagement with contact 21. As soon as this takes place, a circuit will be established to the cooling apparatus as follows: from line wire 28 through conductor 40, bimetallic element 16, contact arm 17, contacts 19 and 21, conductor 49, switch arm 32, contact 36, conductor 50, cooling apparatus 11, and conductors 51, 46 and 47 to the other line wire 29. At the same time, the separation of contacts 18 and 20 interrupts the circuit to the auxiliary heater 25. Thus the effect of contact arm 17 moving from the position in which contacts 18 and 20 are in engagement to the position in which contacts 19 and 21 are in engagement is to place the cooling apparatus in operation, and at the same time to cause deenergization of heater 25 so that the temperature adjacent bimetallic element 16 begins to drop both by reason of the decrease in ambient temperature and by the decrease in the temperature caused by the cooling of heater 25.

It will be apparent that by reason of the cooling effect produced by the deenergization of heater 25, the bimetallic element will be sufficiently cooled to effect a disengagement of contacts 19 and 21 and a reengagement of contacts 18 and 20 before the ambient temperature has dropped to a point where such drop in ambient temperature alone would be sufficient to cause such engagement of contacts 18 and 20. Accordingly, the effect of the cooling of auxiliary heater 25 is to anticipate the termination of operation of the cooling apparatus. Under normal conditions, this will terminate the operation of the cooling apparatus at such a time that by the time the heater 25 has again become reheated by the engagement of contacts 18 and 20 the space will have cooled down to a value sufficiently low to prevent separation of contacts 18 and 20 immediately.

It will be further noted in connection with the operation of the cooling apparatus that the cooling apparatus is never energized, even partially, except when its operation is desired. The energization of the heater 25 is controlled entirely by the contacts 18 and 20. For this reason, it is unnecessary to consider the value of the resistance 25 relative to the internal resistance of the control device of the cooling apparatus. Moreover, there is no loss of energy due to current flowing through the cooling apparatus while it is out of operation.

It will further be noted that the arrangement provides an extremely simple method of getting an anticipation both when the heating apparatus is controlled by the thermostat and when the cooling apparatus is controlled by the thermostat. It is to be understood that while a specific embodiment of the invention has been shown for purposes of illustration, the invention is limited only by the scope of the appended claims.

I claim as my invention:

1. In a temperature control system, electrically controlled heating apparatus and cooling apparatus, a thermostatic switch movable between hot and cold contacts, an auxiliary electrical heater located adjacent to said thermostatic switch, a source of power, connections between said auxiliary heater and said source of power including said thermostatic switch and its cold contact, connections between said heating apparatus and said source of power including said cold contacts and in parallel with said auxiliary heater, connections between said cooling apparatus and said source of power including said hot contact, a first switch in the connections of said heating apparatus to the source of power parallel to said auxiliary heater, a second switch in the connections of said cooling apparatus to said source of power, and means associated with said first and second switches for selectively opening either switch and simultaneously closing the other.

2. In a temperature control system, electrically controlled heating apparatus and cooling apparatus, a thermostatic switch movable betweeen hot and cold contacts with a snap action, an auxiliary electrical heater located adjacent to the thermostatic element of said thermostatic switch, a source of power, a conductor connecting said switch with one side of said source of power, conductors directly and permanently connecting said electrical heater between said cold contact and the other side of the source of power, a direct connection between one terminal of said heating apparatus and said cold contact including a switch, a direct connection between one terminal of said cooling apparatus and said hot contact including a switch, conductors extending directly from other terminals of said heating and said cooling apparatus to said other side of said source of power, and means associated with said two last named switches for selectively opening either switch and simultaneously closing the other whereby the operation of said last named means places either the heating or the cooling apparatus under the control of the thermostatic switch without affecting the connections of the heater.

JOHN P. KRIECHBAUM.